(12) United States Patent
Bertholin et al.

(10) Patent No.: US 7,255,372 B2
(45) Date of Patent: Aug. 14, 2007

(54) DEVICE AND METHOD FOR CONNECTION WITH RELATIVE AND CONTROLLED SEALING BETWEEN A PIPE AND A CERAMIC TUBE

(75) Inventors: Stéphane Bertholin, Villeurbanne (FR); Luc Nougier, Sainte Foy les Lyon (FR); Michel Cohen, Antibes (FR)

(73) Assignee: Institute Francais Du Petrole, Rueil Malmaison, Cedex (FR)

( * ) Notice: Subject to any disclaimer, the term of this patent is extended or adjusted under 35 U.S.C. 154(b) by 0 days.

(21) Appl. No.: 10/805,356

(22) Filed: Mar. 22, 2004

(65) Prior Publication Data
US 2004/0262912 A1 Dec. 30, 2004

(30) Foreign Application Priority Data
Mar. 20, 2003 (FR) .................................. 03.03444

(51) Int. Cl.
*F16L 17/00* (2006.01)
(52) U.S. Cl. .......................... 285/106; 285/96; 285/351
(58) Field of Classification Search ............. 285/121.1, 285/121.3, 900, 910, 351, 95, 96, 106
See application file for complete search history.

(56) References Cited
U.S. PATENT DOCUMENTS
3,984,131 A 10/1976 Gingrich, Jr. et al.

4,122,894 A * 10/1978 Laws et al. .................. 285/211
5,062,910 A 11/1991 Garcera et al.
6,454,274 B2 9/2002 White et al.

FOREIGN PATENT DOCUMENTS
FR 2645941 10/1990
GB 2006351 5/1979

* cited by examiner

*Primary Examiner*—Aaron Dunwoody
(74) *Attorney, Agent, or Firm*—Millen, White, Zelano & Branigan, P.C.

(57) ABSTRACT

Relative and controlled sealing between a pipe (1) and a ceramic tube (7) utilizes a cylindrical chamber (5) that is attached in a sealed manner to the pipe (1), and to one end of the ceramic tube that is placed inside the chamber. At least two sets of sealing fixtures (3, 3') are placed in an annular space between the ceramic tube and the chamber. A crosspiece (4) is interposed between the two sets sealing of fixtures (3, 3'). A metal mating flange (6) is pressed against a compression ring (4') to compress the sealing fixtures (3, 3'). Injection of a fluid (8) between the two sets of sealing fixtures (3, 3') applies a pressure differential that is determined on each of the fixtures.

21 Claims, 4 Drawing Sheets

DEVICE AND METHOD FOR CONNECTION WITH RELATIVE AND CONTROLLED SEALING BETWEEN A PIPE AND A CERAMIC TUBE

This invention relates to a device for connection between a hollow metal part and a ceramic tube that is intended to be used in high-temperature applications, such as heat exchangers and the reactors that are strongly exothermic or endothermic that are used for the execution of reaction such as, for example, the reactions of steam-cracking, pyrolysis, catalytic dehydrogenation or steam reforming. More particularly, the invention finds its application in the endothermic reactors in which the temperature is usually between 600 and 1200° C., and where one of the problems that is to be resolved is to limit the secondary reactions that lead to the formation of tar and/or coke.

Numerous documents describe reactors that operate at high temperature in a potentially coking medium where the catalytic effects of metal walls should be avoided. From this standpoint, the more stable ceramic materials are less likely to act as coke precursors. It is possible to refer to the article "Wall Catalysis: A Fundamental Phenomenon in High-Temperature Hydrocarbon Systems and Its Influence on the Soot Formation" (G. PERUGINI & al., Energy and Ceramics—Proceedings of the 4$^{th}$ International Meeting on Modem Ceramics Technologies, Saint-Vincent, Italy, (1979), pp. 1268-1279), which shows an absence of catalytic coke formation on stable ceramic oxides in a fuel medium that contains hydrogen for temperatures of more than 1000° K.

In addition, in the steam-cracking reactors for which this invention is particularly well suited, the optimum between conversion and selectivity is obtained by increasing the amount of heat that is provided to the reaction and by reducing the dwell time of the reagent. This concept that is put into practice in the so-called "millisecond" furnaces and that is used in steam-cracking is today the preferred process for transformation of saturated hydrocarbons into olefins in the petrochemical industry. In this context, the use of ceramic materials that accept higher operating temperatures than the metal materials is widely found in the literature.

U.S. Pat. No. 6,312,652 describes the use of double-jacket ceramic tubes for the production of ethylene in steam-cracking furnaces with a very short dwell time. In this application, the tubes are placed vertically, suspended with their upper portion in the heat-radiating zone of the furnace. In this patent, at no time is there mention of junctions between metal parts and ceramic parts, as according to our invention.

Document FR 99/15 497 describes a device for flexible connection between a ceramic heat exchange tube and a metal jacket that essentially comprises a conventional packing box to connect a tube and a metal bellows that is attached to the jacket. In this device, the connecting means between the ceramic tube and the packing box consist of porous heat insulation. This device does not relate to a connection with relative and controlled sealing.

U.S. Pat. No. 6,454,274 exhibits a device for assembly between a tubular ceramic membrane and a metal tube, whereby said ceramic membrane is held by the force of friction generated by the compression of ceramic joints placed around said ceramic membrane and inside the metal tube. In this configuration, the device for holding the tube limits its use to vertical applications in the case of a tube of great length and high weight. The applications that are targeted in U.S. Pat. No. 6,454,274 are gas phase membrane separations and not the field of application where the circulating reagent is coking.

U.S. Pat. No. 5,133,577 exhibits a connecting device for the assembly of a ceramic tube on a metal tube with no joint fixture between the tubes. In this configuration, the leakage rate of a sealing gas from the outside to the inside of the tubes cannot be controlled.

In a general way, the connecting devices, with or without a ceramic joint described in these patents, produce an uncontrolled relative sealing that is particularly a problem in the presence of some gases such as hydrogen that diffuses very easily.

This invention eliminates this problem in particular by making possible total and absolute confinement of the reagent in the connection and by producing a relative and controlled sealing by the cooperation of a first mechanical sealing means and a second dynamic means that is obtained by a scavenging gas. In the entire text, the expression "ceramic tube" is to be considered in the broad sense and refers to any element that has an internal volume, preferably with a circular section, of an inside surface and/or an outside surface that may or may not be flat for promoting heat exchanges. A ceramic tube can consist of a series of elementary ceramic tubes that are connected to one another by a device according to the invention. The expression "metal part" should be taken in the sense of any chamber that exhibits, on the one hand, a hollow part that communicates via the device according to the invention with the inside volume of the ceramic tube.

The metal part in question in this invention can be a simple tube, a clarinet that distributes a number of metal tubes in parallel, a collector, a distributor, or any other similar operating part. The invention thus relates to a device for connection with relative and controlled sealing between a pipe and a ceramic tube, comprising:

a cylindrical chamber that is attached in a sealed manner to said pipe, whereby one end of the ceramic tube is placed inside said chamber, sealing means that consist of at least two sets of fixtures that are placed in the annular space between the ceramic tube and the chamber, a crosspiece that is interposed between the two sets, compression means of said fixtures, means for injection of a fluid between the two sets of sealing fixtures so as to apply a pressure differential that is determined on each of the fixtures.

According to a variant of the invention, the end of the ceramic tube can be separated from the pipe by a part that forms a stop, whereby said part has a compression rupture strength that is less both than the strength of the ceramic tube and that of said pipe.

According to another variant, said chamber can comprise a double wall that defines an inside space in which a coolant circulates.

According to another variant of the invention, said inside space can communicate with the space between fixtures.

The chamber generally can be made of refractory steel with high heat resistance.

The ceramic tube generally can be made of sealing ceramic such as: silica-alumina mullite, alumina, zirconia or silicon carbide, and preferably silicon carbide.

The stop part can consist of a compressed silicate-type material that is reinforced by fibers and has a resistance to the leakage in compression that is less than the least of the resistances of the ceramic tube, on the one hand, and the cylindrical chamber or the pipe, on the other hand.

The sealing fixtures can consist of fibers such as silico-alumina, alumina, zirconia or graphite. In some cases, the fibers of the fixtures can be impregnated with a ceramic material or a metal material.

In other cases, at least one of the sealing fixtures can consist of ceramic powder.

The coolant that circulates inside the cylindrical chamber can be water vapor.

In some applications of the invention, the pipe can be a tube that is identical to the ceramic tube, whereby the end of each of the ceramic tubes is placed in said chamber and linked to the chamber by identical sealing means so as to form a connection between two ceramic tubes.

The invention also relates to a method for controlling the sealed connection of the device according to the invention, which consists in the following stages:
  the pressure difference between the reagent that is present in the pipe and said fluid is measured,
  the pressure difference is adjusted to keep a flushing leakage toward the inside of the tube.

The device according to the invention can be applied more particularly, without these indications constituting a limitation, to installations for steam-cracking, pyrolysis, catalytic dehydrogenation, or vaporeforming.

In the case of application to a steam-cracking installation, the reagent can have a high temperature, preferably between 600 and 1200° C.

The invention will be better understood from reading the following description of embodiments, by no means limiting, illustrated by the figures that are attached below, among which:

BRIEF DESCRIPTION OF THE DRAWINGS

FIG. 1 shows a cutaway view of the connecting device according to the invention between a metal part of tubular shape (1) that is generally made of refractory steel, such as, for example, Haynes 230, Haynes 214, Incoloy 800, Incoloy 601, Incoloy MA956 or Kanthal APM, and a ceramic tube with a cylindrical section (7) that is made of sealed ceramic, such as, for example, of silica-alumina, mullite, alumina, zirconia or silicon carbide.

Figure 1:
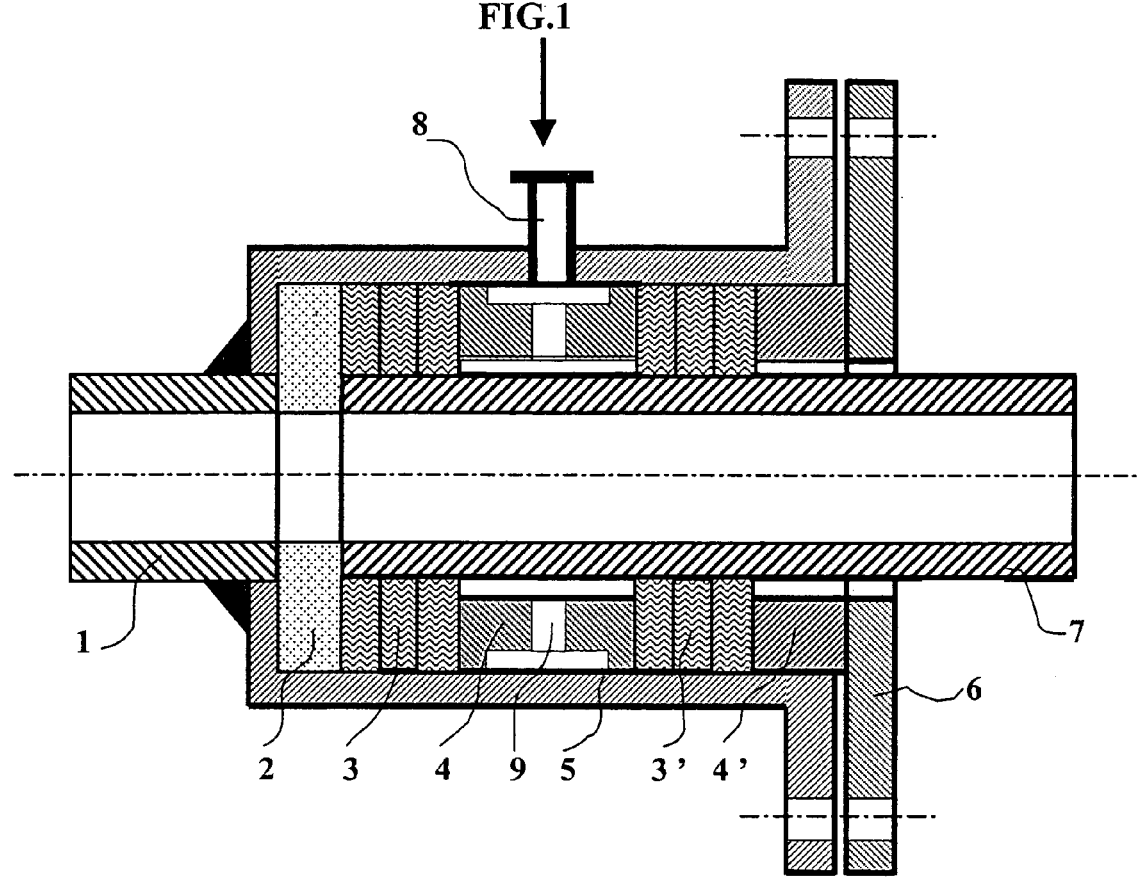
FIG. 1 shows a longitudinal cutaway view of the device according to the invention.

This device comprises a cylindrical metal chamber or sleeve (5) that is connected in a sealed manner to metal tube (1) at one of its ends and that comprises a flange at the other end. The end of one ceramic tube (7) is placed in sleeve (5) opposite said tube (1). A thrust washer (2) that is made of silicate and hard fiber is positioned between the ends of metal tube (1) and ceramic tube (7). A first series of sealing fixtures made of ceramic fiber (3) is placed in the annular space that is defined by the inside of the chamber and the outside of the ceramic tube, resting snugly on washer (2). A crosspiece (4) is interposed between first fixture series (3) and a second fixture series (3'). A compression ring that forms a second rigid support (4') forms the rest of the stack up to a metal mating flange (6).

The chamber comprises an inlet port, for example for cover gas (8), that makes possible the introduction of a fluid into space (9) between two sets of fixtures (3) and (3'). For this purpose, crosspiece (4) is added so that the circulation of the fluid allows the application of pressure to the two faces of sealing fixtures (3) and (3').

In this configuration, metal tube (1) that is used as a pipe for communication with the inside of the ceramic tube and ceramic tube (7) are separated by a stop part in the shape of a compressed silicate-type ring (2) that is reinforced by fibers such as, for example, Monalite 1000, Duratec 1000 or Salü1000. The material can exhibit a deformation rate by compression that is higher than that of materials that constitute the ceramic tube and the metal part. In this way, in the case of relative displacement between the tubes, this stop can be deformed without damaging tubes. The stop part preferably is made of material whose compression strength is such that the latter breaks before the ceramic tube and/or the chamber or the pipe.

The radial force of the sealing fixtures on the ceramic tube, necessary both in holding the tube and in the sealing, is obtained by deformation of sealing fixtures (3) and (3') under the effect of a longitudinal compression force that is obtained by tightening mating flange (6) on the flange of cylindrical chamber (5). Mating flange (6) rests on compression ring (4') that is exhibited here in the form of a metal or ceramic washer. Thus, first fitting (3) is compressed longitudinally between thrust ring (2) and crosspiece (4) to exert a first radial tightening force on tube (7). Fixture (3') is compressed longitudinally between crosspiece (4) and compression ring (4') to exert a second radial tightening force on tube (7). The combination of these two tightening forces that are spaced the width of the crosspiece apart keeps the ceramic tube in position longitudinally, laterally and angularly.

Two sets of sealing fixtures (3) and (3') each consist of one or more fixtures that are made of fibers, such as, for example, silico-aluminous, alumina, zirconia or graphite fibers, with or without impregnation of ceramic particles (Al2O3, ZrO2, MgO . . . ) or metal particles (Si, Au . . . ).

These sealing means have an efficiency that is based on the compression rate that is applied to them. This efficiency is reflected by a suitable leakage rate of a fluid, for example a cover gas, which is injected via inlet port (8) that is located on metal chamber (5) and comes out into annular space (9) that is defined between the outside of the ceramic tube and the inside of the chamber. By the nature and the length of the fixtures, it is possible to adjust, for a given pressure differential between the two faces of the fixtures, the leakage rate along sealing fixtures (3) and (3').

By the selection of this differential relative to the surrounding pressure, generally the atmospheric pressure, it is possible to adjust for a given nature and volume of the fixture the distribution of the flows of cover gas that join with the reagent, on the one hand, and flow into the outside environment, on the other hand.

For example, to limit the injection of cover gas or another fluid in the reagent that circulates inside the tubes, it will be possible to adjust the pressure of the cover gas based on the pressure of the reagent to establish a necessary exact counterpressure so that the amount of cover gas leakage ensures the flushing of sealing fixtures (3) required for their preservation, for example for an accelerated ageing following the coking.

Taking into account the fact that the pressure differentials are not the same for each of the sets of fixtures, the latter may have a different nature and/or length so as to regulate the outside leakages and the inside leakages differently.

Figure 2:
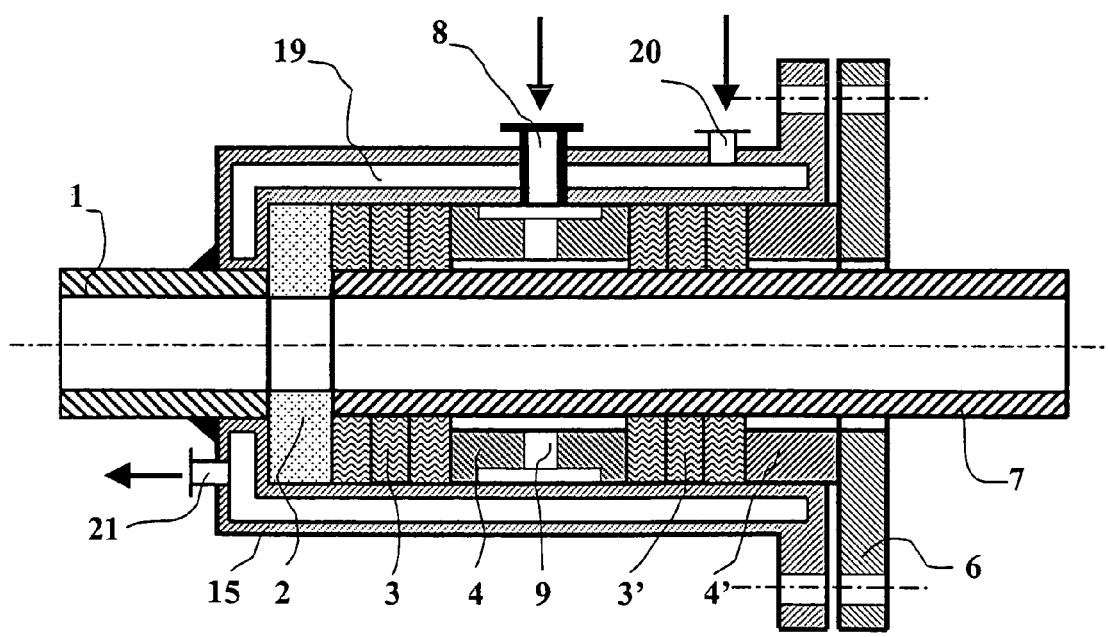
FIG. 2 shows a longitudinal cutaway view of the device according to the invention in a double-jacket configuration that allows the cooling of the chamber by a coolant.

FIG. 2 shows a cutaway view of a variant of the device in the case where metal sleeve, or chamber (15) is made with a double wall for allowing the circulation of a coolant that ensures the cooling of the connecting and sealing unit, whereby the fluid circulates in inside space (19) of the double jacket.

The coolant penetrates metal double-jacket chamber (15) via inlet (20), circulates in space (19), and then is evacuated via outlet (21). This fluid may be the cover gas that is used to flush sealing means (3) and (3') by using in this case the same supply network. If the nature of the fluid is different, it then circulates in an independent network with low pressure and a high flow rate. The coolant may be liquid in some cases.

The sealing means and holding means may be similar to those of FIG. 1.

Figure 3:
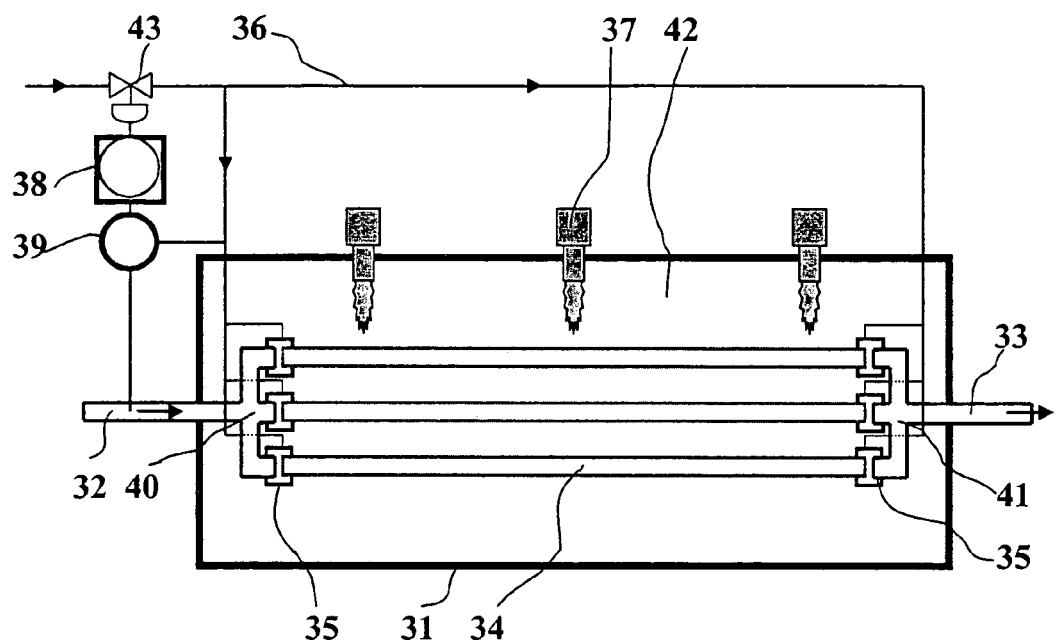
FIG. 3 diagrammatically shows a reactor that uses the device according to the invention and the system for pressure control that is used to carry out the dynamic flushing.

FIG. 3 shows an example of configuration of the reactor using the device of this invention that comprises an outside chamber (31) that comprises a reagent inlet (32), a distributor (40), ceramic tubes (34), connecting devices according to the invention (35), a collector (41), a reagent outlet (33) and heat energy input systems (37).

In this example, the reagent penetrates chamber (31) via inlet (32), is distributed into various ceramic tubes (34) by metal distributor (40), circulates in the ceramic tubes, for example positioned horizontally, and reacts under the action of the heat that is supplied by burners (37) in inside volume (42) of chamber (31), then is evacuated toward outlet (33) via metal collector (41). At the ends of each ceramic tube (34), connecting devices according to the invention connect the ceramic tubes to distributor (40) and to collector (41). The inside volume of chamber (42) is at atmospheric pressure, and the reagent that circulates in the ceramic tubes is at a pressure that is higher than atmospheric pressure.

Connecting devices (35) are connected individually and collectively to a supply network of cover gas (36) whose feed pressure is regulated by a valve (43). This regulation is carried out by means of a controller (38) that acts based on the measurement of pressure difference (39) between the network for input of cover gas (36) and the input of reagent (32). The pressure difference is kept positive at a defined value initially based on sealing means that are installed in connecting devices (35) and the flow rate of cover gas with desired flushing. The value of this pressure differential is generally between 1 millibar and 1 bar, and preferably between 10 millibar and 500 millibar.

In this way, possible pressure variations of the reagent are taken into account immediately so as to keep the pressure differential constant by acting on the cover gas flow rate.

Figure 4:
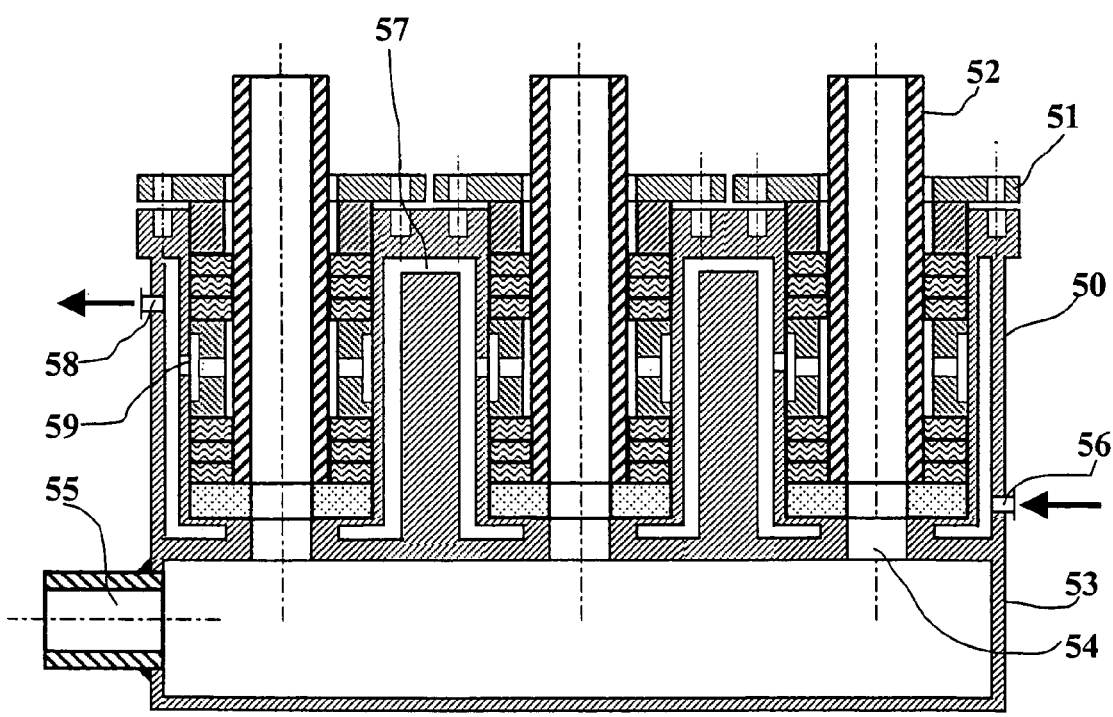
FIG. 4 shows a cutaway view of a configuration with several devices in the same cooling chamber, corresponding to several ceramic tubes.

FIG. 4 shows an example of configuration of connecting devices in the case of a bundle of ceramic tubes, using the same supply network of cover gas and coolant.

A metal chamber (50) comprises a number of connecting devices with relative and controlled sealing (51) according to the invention and a number of ceramic tubes (52). A hollow metal part (53) is connected to chamber (50) by a number of orifices (54) that is essentially aligned with ceramic tubes (52) of chamber (50). The reagent penetrates hollow metal part (53) via inlet (55), and passes through orifices (54) of tubular shape in ceramic tubes (52) that are attached by connecting devices (51) in chamber (50).

The scavenging cover gas penetrates chamber (50) via inlet (56), circulates in hollow volume (57), then penetrates a number of connecting devices (51) by a number of orifices (59).

In this example, the cover gas also plays the role of coolant.

The configuration that is described is an illustrative example, and numerous configurations that are not described, comprising, for example, a number of reagent inlets or a number of scavenging gas inlets, can be produced without moving away from the spirit and the field of application of this invention. Also, cover gas inlets can be separated from coolant inlets so as to allow the use of two different fluids.

Figure 5:
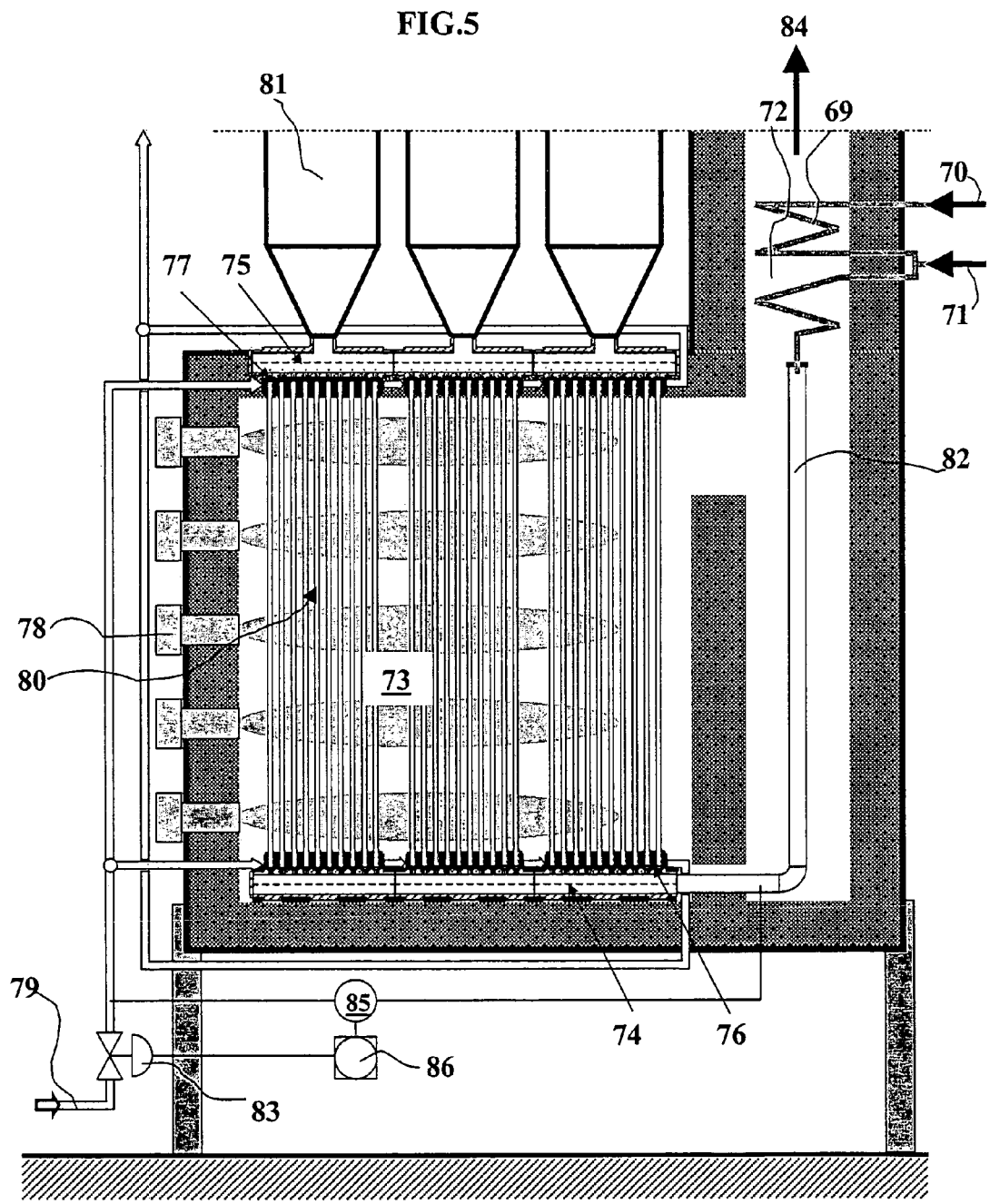
FIG. 5 shows a sample application of the device according to the invention with a steam-cracking furnace.

FIG. 5 shows an industrial application of the device according to the invention with a steam-cracking furnace that uses a number of connecting devices with controlled sealing (76) and (77) that are connected to a common supply of cover gas (79).

The device according to the invention makes it possible to use tubes that are made of ceramic material in the radiation zone instead of the metal tubes that are used in the standard furnaces.

The selected example is a naphtha steam-cracking furnace for the production of olefins. The cover gas in this case is water vapor.

Naphtha feedstock (70) penetrates the convection zone of furnace (72) by circulating inside a convection bundle (69), is preheated by convection heat exchange with smoke (84), then mixes with water vapor (71) that is introduced into convection bundle (69) that contains the feedstock.

The mixture of feedstock and water vapor that is thus formed is brought via pipe (82) to metal distributor (74) on which ceramic tubes (80) are attached by a number of connecting devices with controlled sealing (76) according to the invention, for example according to the representation of FIG. 4.

The mixture of feedstock and water vapor traverses radiation zone (73) through ceramic tubes (80), reacts under the effect of the heat that is produced by burners (78), then is evacuated into metal collector (75) via a number of sealing devices (77) according to the invention as shown in FIG. 4. The resulting effluent of the steam-cracking reaction is then cooled in exchangers (81) that are connected to collector (75), then evacuated toward a transfer line that is not shown here.

The flow rate of scavenging steam (79) is regulated by valve (83) to keep a positive pressure difference between the input of the scavenging steam at the connecting devices with controlled sealing (76) and (77) and the input of the naphtha/dilution steam mixture in metal distributor (74).

This pressure difference is measured by sensor (85), whereby the information is sent to controller (86) that controls control valve (83).

In this way, the confinement of the process fluid is ensured thanks to connecting devices with controlled sealing (76) and (77).

For example, for this application, it is possible to size the connecting devices with controlled sealing so that the scavenging steam flow rate remains less than 10% of the flow rate of steam consumed by the process. For a process pressure of 2 bar, the regulation of the pressure difference at 0.5 bar, corresponding to a scavenging steam pressure of 2.5 bar, provides the following distribution: about 30% of the scavenging steam flow penetrates ceramic tubes (80) and about 70% of this same flow leaks into the heat-radiating chamber of furnace (73).

Thus, the flow rate of scavenging steam that is introduced into the process by the connecting devices with controlled sealing (76) and (77) represents only about 3% of the total flow rate of steam that is consumed by the process.

The selection of the overpressure level of the scavenging steam depends partly on the pressure fluctuations of the process fluid. In this case, these fluctuations are typically less than 0.3 bar, and the additional 0.2 bar corresponds to a safety margin, but could be reduced, which would then lead to a lower leakage rate.

In general, the overpressure level in an application will be selected so as to lead to flow rates of scavenging gas leakage that will represent as limited percentages as possible relative to the process fluid flow rate.

Different scavenging steam flow rates between inlet connecting device (76) and outlet connecting device (77) may be necessary for taking into account pressure and temperature differences at the inlet and at the outlet of ceramic tubes (80). In this case, the flow rates are regulated separately.

Figure 6:
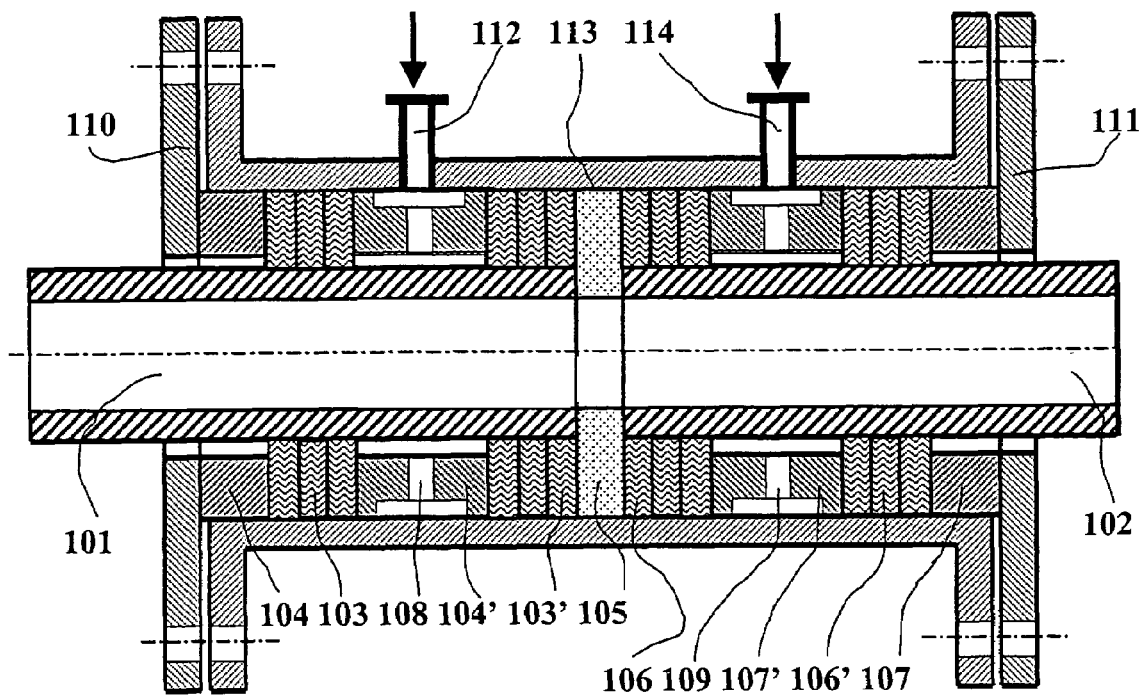
FIG. 6 shows a cutaway view of the device according to the invention in the variant of a connection between two ceramic tubes.

FIG. 6 shows a cutaway view of the device according to the invention in the particular case of a connection between two ceramic tubes (101) and (102).

This device comprises a metal chamber (114) that is closed by flanges at its two ends, comprising two cover gas inlets (112) and (113) that traverse metal chamber (114) and come out respectively in a volume (108) and (109), a silicate and hard fiber fixture (105) that is positioned between two tubes (101) and (102), four sealing fixture series made of ceramic fiber (103), (103'), (106) and (106'), two crosspieces allowing the circulation of cover gas (104') and (107') and two rings (104) and (107) resting respectively on mating flanges (110) and (111).

The tightening of two mating flanges (110) and (111) ensures the compression of sealing fixtures (103), (103'), (106) and (106') either between two rigid supports for sealing fixtures (103) and (106') or between a rigid support and the silicate and hard-fiber fixture (105) for sealing fixtures (103') and (106).

The device thus consists of two devices according to FIG. 1 that are placed in a series, whereby the confinement of the process that is contained in tubes (101) and (102) is ensured by the cover gas scavenging through sealing fixtures (103') and (106).

The ceramic tubes can be placed preferably vertically. In this case, the upper tube abuts against the lower tube via fixture (105), which is entirely acceptable with ceramic materials such as silicon carbide that exhibits a very good cold-compression strength as well as high-temperature strength.

This device can comprise a metal, double-wall chamber that makes possible the circulation of a coolant that ensures the cooling of said chamber. Likewise, devices that comprise a number of tubes in the same chamber that itself comprises a common inlet or a number of inlets of cover gas and/or coolant can be carried out in the same spirit as this invention.

COMPARISON EXAMPLE

By numerical calculations on a steam-cracking simulation software CRACKSIM developed by the petrochemical technological laboratory of the University of Ghent, it is possible to compare the efficiency of a furnace with ceramic technology that uses this invention with that of a standard KELLOG-type "millisecond" furnace. These furnaces use metal tubes that are 10 meters in length with exchanged heat flows on the order of 85 kW/m². In the case of use of ceramic tubes, the technology according to the invention makes possible the lengths of tubes of about 4 meters in length in the heat-radiating section. Although shorter, the flows that can be exchanged are more significant because of the greatest stability of ceramics at high temperature. The common elements of these two furnace concepts in the calculation are as follows:

Production of ethylene: 100,000 t/year
Dilution steam: 0.6 kg of steam/kg of naphtha
Nature of the feedstock: in % by weight per family of components:

| | |
|---|---|
| Normal paraffins: | 37.73 |
| Isoparaffins: | 35.28 |
| Naphthenes: | 21.53 |
| Aromatic compounds: | 5.37 |
| Olefins: | 0.1 | for a density at 15° C. of 0.6924,
initial temperature of the naphtha in the heat-radiating zone of the furnace: 600° C.
pressure of the naphtha/steam mixture: 2 bar absolute
inside diameter of the tubes: 35 mm.

The table below summarizes the hypotheses and the results for the two embodiments:

| | Ceramic Technology | Metal Technology |
|---|---|---|
| Geometry | | |
| Length of tubes (m) | 4 | 10 |
| Number of tubes | 560 | 420 |
| Mean Flux on the Tubes (kW/m²) | 190 | 85 |
| Dwell time (ms) | 84 | 154 |
| Outlet temperature of the Gas (° C.) | 940 | 920 |
| Composition of the Gas (% by Weight) | | |
| Methane | 13.4 | 14.7 |
| Ethylene | 30.3 | 30.3 |
| Propylene | 15.8 | 15.0 |
| Degree of Severity (Ethylene/Propylene) | 0.52 | 0.5 |

These calculations exhibit advantageous results for the case of a ceramic tube with a larger sum of products that can be upgraded (ethylene+propylene) for a smaller amount of methane, a low-value compound, that is produced. It is also possible to add that by considering a median price of propylene that is between $400 and $450/ton, the increase in the propylene selectivity of 0.8% represents a gain of more than $1,000,000 per year.

The other advantageous aspect for this application is the reduction of the catalytic coke produced on the metal surfaces. By assuming that the ceramic tubes are made of silicon carbide, it is possible to refer to the article "Anti-coking Coatings for High-temperature Petrochemical Reactors" (P. Broutin et al., Oil & Gas Science and Technology—Rev. IFP, Vol. 54, (1999), No. 3, pp. 375-385), in which coking tests that are produced by steam-cracking n-hexane on a sample of a typical furnace tube alloy with a high content of nickel and chromium and a sample of α-type silicon carbide revealed a reduction by a ratio 4.5 of the coke production on the silicon carbide relative to the metal alloy. This point is very important in terms of clogging furnace tubes and consequently in terms of the length of operating time between two periods of decoking.

In connection with this, tests carried out by the NOVA Company and summarized in the article "Achieving Longer Furnace Runs at NOVA Chemicals" (A. Apuzzo, L. Benum, ERTC Petrochemical Conference, Amsterdam, Netherlands (2002)) demonstrate the advantage of using a material that is not readily coking for the production of steam-cracking furnace tubes. The ANK400 material that they have developed makes it possible to extend the duration of the first operating cycle to 400 days instead of the 33 days that are usually obtained with standard tubes.

This performance level decreases over the following cycles to reach 150 days during the fourth cycle. By assuming that the silicon carbide offers advantages in terms of non-coking surface that are similar to the ANK400 material, we can consider the same types of performance levels on the first cycle. Over the long term, as the silicon carbide is by nature more stable than a metal alloy, its anti-coking properties should be maintained after decoking. In this case, and contrary to the ANK400 material, the performance levels that are acquired during the first cycle would be preserved during subsequent cycles.

An additional advantage that is linked to the reduction of the coke formation is the possibility of using tubes of smaller diameter without being confronted with clogging problems. For example, with tubes that are 20 mm in diameter, the simulation software CRACKSIM provides the following performance levels, with the same hypotheses as in the preceding cases:

|  | Ceramic Technology (Tube Diameter = 20 mm) |
|---|---|
| Geometry |  |
| Length of Tubes (m) | 4 |
| Number of Tubes | 915 |
| Mean Flux on the Tubes (kW/m²) | 190 |
| Dwell Time (ms) | 43 |
| Outlet Temperature of the Gas (° C.) | 960 |
| Composition of the Gas (% by Weight) |  |
| Methane | 12.3 |
| Ethylene | 30.3 |
| Propylene | 16.3 |
| Degree of Severity (Ethylene/Propylene) | 0.54 |

A very advantageous increase of the ethylene+propylene sum (+1.3% of propylene relative to the standard metal case) with a strong reduction in the amount of methane that is produced (−2.4%) is noted. This clear improvement in performance levels, made possible by the use of ceramic materials that are not readily coking and that are resistant to high temperatures, demonstrates the potential of this new technology.

The invention claimed is:

1. A device for connection with relative and controlled sealing between a pipe (1) and a ceramic tube (7) comprising:

a cylindrical chamber (5) that is attached in a sealed manner to said pipe, whereby one end of the ceramic tube is placed inside said chamber, a seal comprising at least two sets of sealing fixtures (3, 3') placed in the annular space between the ceramic tube and the chamber, a crosspiece (4) interposed between the two sets of sealing fixtures (3, 3'), a flange (6) for applying longitudinal pressure to a compression ring in the form of a flange (6) for compressing the sealing fixtures (3, 3'), the compression ring (4') applying longitudinal pressure to one set of sealing fixtures (3') which compress against the crosspiece (4), the crosspiece (4) applying longitudinal pressure against the other set of sealing fixtures (3) that compress with respect to the housing (5), and an injector arrangement (8) for injection of a fluid between the two sets of sealing fixtures (3, 3') so as to apply a pressure differential that is determined on each of the fixtures (3, 3').

2. A device according to claim 1, in which the end of the ceramic tube is separated from the pipe by a stop-forming part (2).

3. A device according to claim 1, in which said chamber comprises a double wall that defines an inside space (19) in which a coolant circulates.

4. A device according to claim 3, in which said inside space communicates with space (9) between fixtures.

5. A device according to claim 1, in which the chamber comprises heat-resistant refractory steel.

6. A device according to claim 1, in which the ceramic tube comprises sealed ceramic selected from the group consisting of: silica-alumina, mullite, alumina, zirconia, and silicon carbide.

7. A device according to claim 2, in which the stop-forming part comprises a compressed silicate-type material reinforced by fibers having a compression rupture strength that is less than that of the ceramic tube and that of the cylindrical envelope.

8. A device according to claim 1, in which the sealing fixtures comprises silica-alumina-, alumina-, zirconia- or graphite-type fibers.

9. A device according to claim 8, in which the fibers of the fixtures have been impregnated with a ceramic material or a metal material.

10. A device according to claim 1, in which at least one of the sealing fixtures comprises ceramic powder.

11. A device according to claim 1, in which said fluid is steam.

12. A device according to claim 1, in which said pipe comprises a tube identical to said ceramic tube, and in which the ends of each of the ceramic tubes are placed in said chamber and linked to the chamber by identical sealing means.

13. A method comprising providing a device according to claim 1, and further comprising, for controlling the sealed connection of the device:

measuring the pressure difference between the reagent that is present in the pipe and said fluid, adjusting the pressure difference to keep a flushing leakage toward the inside of the tube.

14. A device according to claim 1 incorporated in a steam-cracking, pyrolysis, catalytic dehydrogenation or steam-reforming installation.

15. A device according to claim 14 incorporated in a steam-cracking installation operating at a temperature between 600 and 1200° C.

16. A device according to claim 6, wherein said ceramic tube comprises silicon carbide.

17. A device according to claim 3, in which the end of the ceramic tube is separated from the pipe by a stop-forming part (2).

18. A device according to claim 4, in which the end of the ceramic tube is separated from the pipe by a stop-forming part (2).

19. A device according to claim 18, in which said pipe comprises a tube identical to said ceramic tube, and in which the ends of each of the ceramic tubes are placed in said chamber and linked to the chamber by identical sealing means.

20. The device of claim 1 wherein the injector arrangement (8) is configured as a port for connection to pressurized fluid.

21. A connection device suitable for providing controlled sealing between a pipe and a ceramic tube, said device comprising:

a cylindrical chamber (5) which at one of its ends is attachable in a sealed manner to a pipe, said chamber also having an opening at the other end to permit placement of one end of a ceramic tube inside said chamber, at least two sets of sealing fixtures (3, 3') positioned within said chamber for contacting the outer surface of a ceramic tube positioned inside said chamber, a crosspiece (4) interposed between said two sets of sealing fixtures, a compression ring (4') for compressing said two sets of sealing fixtures (3,3'), the compression ring (4') applying longitudinal pressure to one set of sealing fixtures (3') which compress against the crosspiece (4), the crosspiece (4) applying longitudinal pressure against the other set of sealing fixtures (3) that compress with respect to the housing (5), and an inlet port (8) for injection of a fluid between said two sets of sealing fixtures.

* * * * *

UNITED STATES PATENT AND TRADEMARK OFFICE
CERTIFICATE OF CORRECTION

PATENT NO. : 7,255,372 B2 Page 1 of 1
APPLICATION NO. : 10/805356
DATED : August 14, 2007
INVENTOR(S) : Stephane Bertholin It is certified that error appears in the above-identified patent and that said Letters Patent is hereby corrected as shown below:

On the title page, item [73]:
Assignee reads "Institute" should read -- Institut --
Assignee reads "Malmaison, Cedex" should read -- Malmaison Cedex --

Signed and Sealed this

First Day of April, 2008

JON W. DUDAS
*Director of the United States Patent and Trademark Office*